US006221524B1

(12) United States Patent
Andrew et al.

(10) Patent No.: US 6,221,524 B1
(45) Date of Patent: Apr. 24, 2001

(54) STRAP FOR THIN METAL FILM BATTERY

(75) Inventors: Michael G. Andrew, Menomonee Falls; Thomas J. Dougherty, Waukehsa; Jeffrey P. Zagrodnik, Hales Corners, all of WI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/205,915

(22) Filed: Dec. 4, 1998

Related U.S. Application Data

(60) Provisional application No. 60/071,786, filed on Jan. 19, 1998.

(51) Int. Cl.[7] .............................. H01M 2/26; H01M 2/36; H01M 4/00
(52) U.S. Cl. .......................... 429/94; 429/211; 429/161; 429/178
(58) Field of Search .................................. 429/211, 161, 429/158, 159, 94, 178

(56) References Cited

U.S. PATENT DOCUMENTS

| 3,494,800 | 2/1970 | Shoeld . |
| 3,732,124 | 5/1973 | Cailley . |
| 3,960,603 | 6/1976 | Morioka et al. . |
| 5,045,086 | 9/1991 | Juergens ............................... 29/623.1 |
| 5,047,300 | 9/1991 | Juergens ................................. 429/94 |
| 5,198,313 | 3/1993 | Juergens ................................. 429/94 |
| 5,368,961 | 11/1994 | Juergens ................................ 429/233 |
| 5,599,641 | 2/1997 | Ching, Jr. et al. .................... 429/179 |
| 6,051,336 | * 4/2000 | Dougherty et al. ................... 429/149 |

FOREIGN PATENT DOCUMENTS 0 545 906 A2    10/1989   (EP) .

OTHER PUBLICATIONS

PCT International Search Report in International Appln. No. PCT/US99/00986, dated May 10, 1999.
"Preparation for an Alkali Storage Battery," *Patent Abstracts of Japan*, Publ. No. 57046468, Publ. Date Mar. 16, 1982.
"Manufacture of Battery Having Spiral Electrode Body," *Patent Abstract of Japan*, Publ. No. 60049558, Publ. Date Mar. 18, 1985.
"Positive Current Collector for Battery," *Patent Abstracts of Japan*, Publ. No. 60049560, Publ. Date Mar. 18, 1985.

* cited by examiner

*Primary Examiner*—Stephen Kalafut
*Assistant Examiner*—Tracy Dove
(74) *Attorney, Agent, or Firm*—Quarles & Brady LLP

(57) ABSTRACT

A thin metal film battery cell is formed by one or more plates wound in a spiral thereby forming a roll with two ends at which spiralled edges of the plates are exposed. Each end of the roll is covered by an end strap which includes a body of electrically conductive material from which a tab extends. The body contacts each convolution of the roll while leaving a portion of each convolution exposed so that an electrolyte is able to flow into the roll. The tab attached to and projecting outward from the body for making electical connection to the thin metal film battery cell.

14 Claims, 5 Drawing Sheets

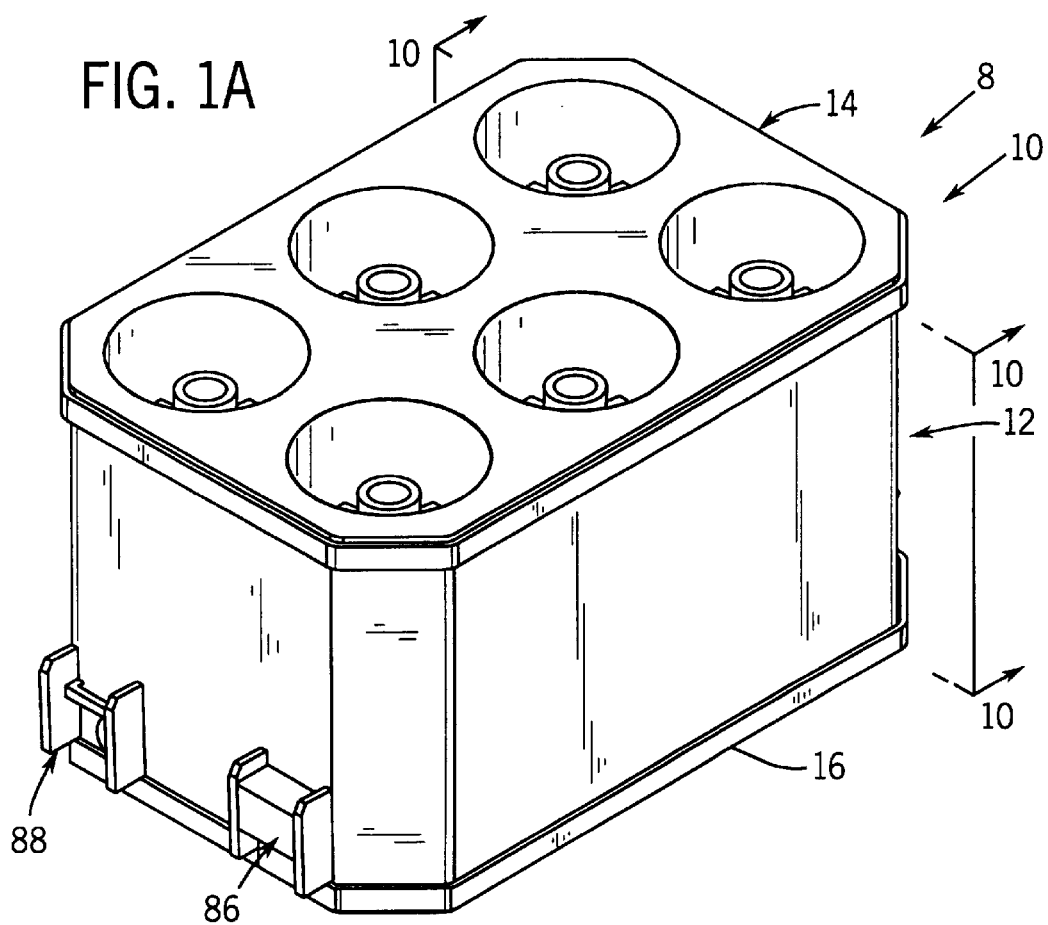

STRAP FOR THIN METAL FILM BATTERY

CROSS REFERENCE TO RELATED APPLICATIONS

This application claims the benefit of U.S. Provisional Application No. 60/071,786 filed Jan. 19, 1998.

BACKGROUND OF THE INVENTION

This invention relates to electric storage batteries and more particularly to a termination strap for thin metal film battery cells.

A thin metal film battery cell includes plates made from very thin lead foil pasted with an active material on both surfaces. Plates with positive active material and plates with negative active material are separated by a separator strip and are spirally wound to form a roll. Unpasted edges of the positive plates extend in one direction while unpasted edges of the negative plates extend in an opposite direction from the roll. Terminations of lead or lead alloy are cast on or soldered to the ends of the spiral roll. U.S. Pat. No. 5,198,313 issued Mar. 30, 1993, for "Battery End Connector" describes one arrangement of cast-on end connectors for the two ends of a spiral roll.

The present invention provides a termination for a thin metal film roll in the form of a cap-like strap which uses less lead than the terminations of the prior art and which facilitates improved exposure of each of the spiral layers, or convolutions, to electrolyte. The strap also facilitates high voltage extrusion welding of the straps of adjacent cells.

SUMMARY OF THE INVENTION

In accordance with the invention, a cap-like strap is formed at an end of a spirally wound cell of alternating convoluted layers of positive and negative thin metal foil plates. The shapes of the straps are is charactrized by the fact that the strap engages a portion of the projecting ends of each layer of the spiral, while leaving another portion of the projecting ends of each layer exposed. The strap is further characterized by an upstanding, integrally formed tombstone portion for connection to adjacent cells or to a terminal. A strap having the foregoing characteristics is formed at each end of the spiral roll.

The strap can take a variety of configurations and is preferably cast in place on the end of the spiral roll.

The foregoing and other objects and advantages of the invention will appear in the detailed description which follows. In the description, reference is made to the accompanying drawings which illustrate preferred embodiments of the invention.

BRIEF DESCRIPTION OF THE DRAWINGS

FIG. 1A is a perspective view of a battery using the straps of the present invention;

DETAILED DESCRIPTION OF THE PREFERRED EMBODIMENTS

Figure 1:
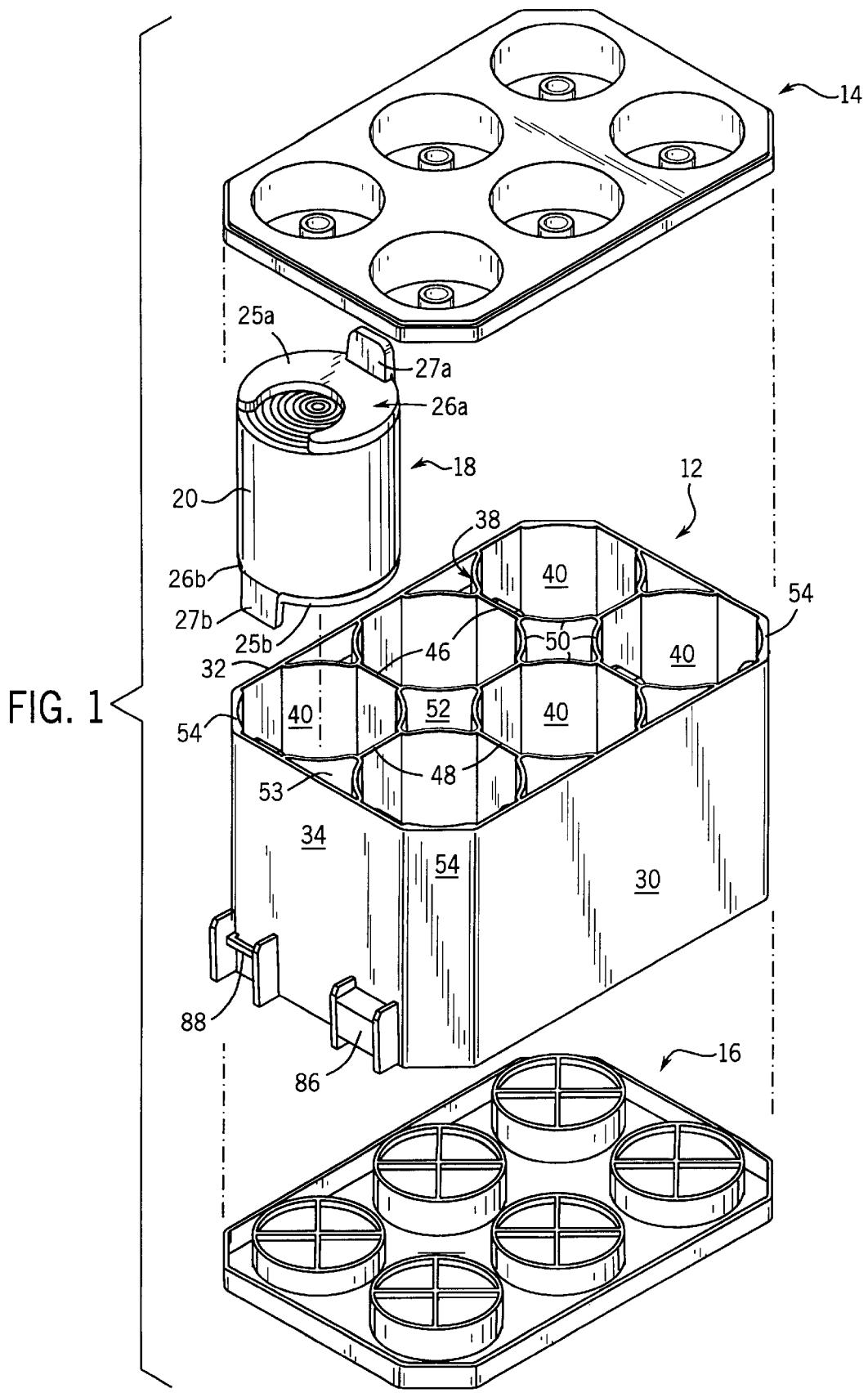
FIG. 1 is an exploded view in perspective of a battery using the straps of the present invention.

The basic battery construction shown in the drawings is the subject of a co-pending patent application Ser. No. 09/008,719 now U.S. Pat. No. 6,051,336 of Thomas J. Dougherty, Michael G. Andrew, Gerald K. Bowen, and Jeffrey Zagrodnik for "Battery Case for Thin Metal Film Cells" filed Jan. 19, 1998, and assigned to the assignee of this application. The disclosure of the co-pending application is incorporated herein by reference as though fully set forth.

Briefly, the battery 8 illustrated in the drawings includes a case 10 having a body 12 with a top 14 and a bottom 16 each joined to the body 12 in a manner known in the art, such as by heat sealing. The case is configured to accommodate a plurality of thin metal film cells 18 that include a spirally wound thin metal film roll 20 coiled in a manner generally known in the art. That is, thin lead foil plates coated with positive or negative active material are spirally wound with a separator layer between the plates. The positive and negative plates are wound axially off-set from each other so that the edges of the positive plate protrude axially from one end and the edges of the negative plate protrude axially from the other end.

As thin metal film battery cells are generally known in the art, recognized techniques for manufacturing such cells and the manner in which they generate electricity will not be described herein. For a general description of such cells, reference may be had to U.S. patent application Ser. No. 08/870,803, filed Jun. 6, 1997, entitled "Modular Electric Storage Battery", and assigned to the assignee of the present invention. The disclosure of such earlier filed application is incorporated herein by reference.

Figure 3:
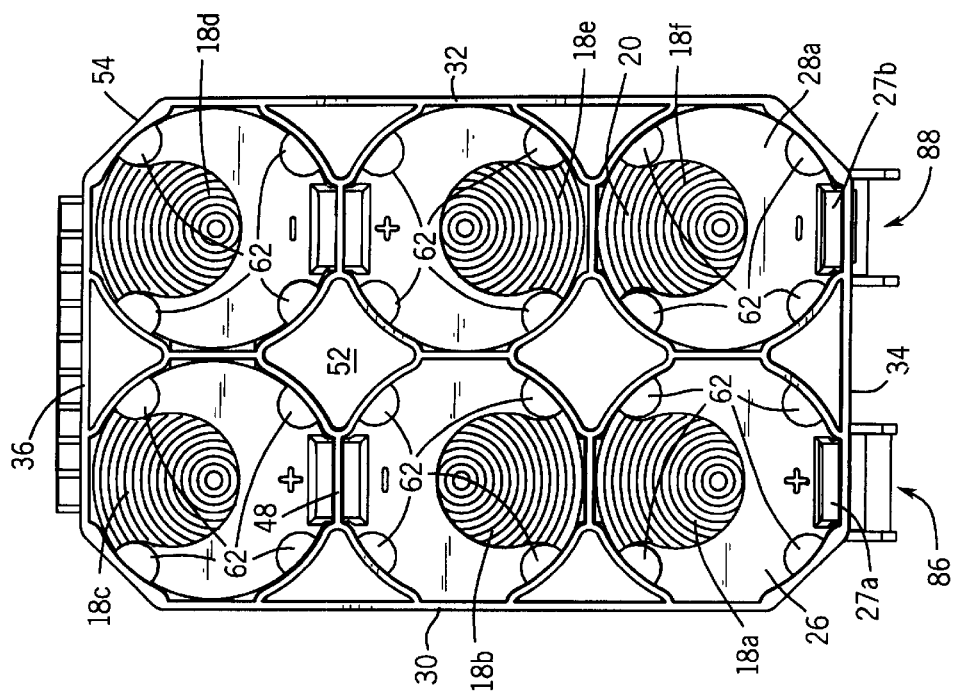
FIG. 3 is a top view of the battery of FIG. 1 with a bottom removed.
Figure 4:
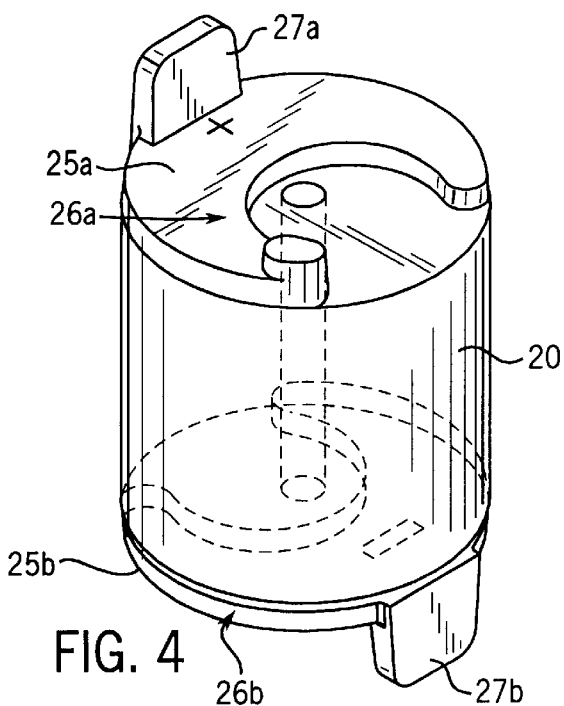
FIG. 4 is a perspective view of a battery cell with the straps of the present invention.
Figure 5:
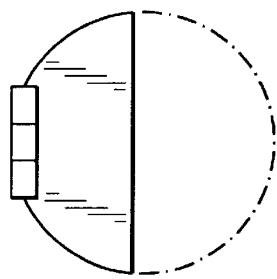
FIGS. 5–9 are plan views of alternative shapes for the strap of the present invention.
Figure 6:
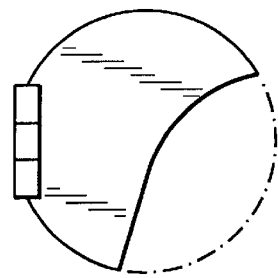
Figure 7:
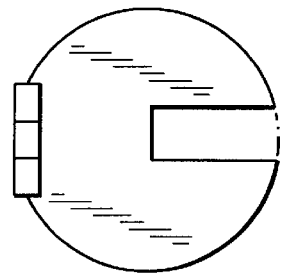
Figure 8:
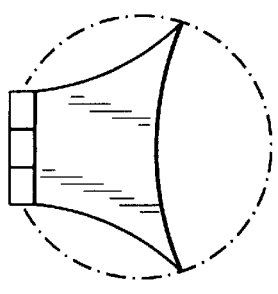
Figure 9:
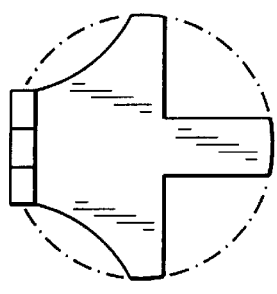

Each end of the spirally wound roll of plates and separator is joined to a cap-like strap 26a and 26b fabricated of lead which is cast in place and connects the projecting edges of one of the positive or negative plates. As shown in FIG. 1, the straps 26 are configured in such a manner that they connect with all convolutions of the spirally wound roll but also expose an axial end portion of each spiral convolution. The result is that an electrical connection is established to the positive or negative plates while at the same time allowing electrolyte to pass axially into each convoluted layer of the roll. Each strap 26a and 26b has a flat body 25a and 25b, respectively, from which extend an integral tombstone portion forming a tab 27a and 27b, respectively. As shown in FIG. 3, the tabs 27a and 27b on certain of the straps on opposite ends of the roll 20 are off-set by 180°. On other rolls 20, the tabs are off-set by 90°.

Figure 2:
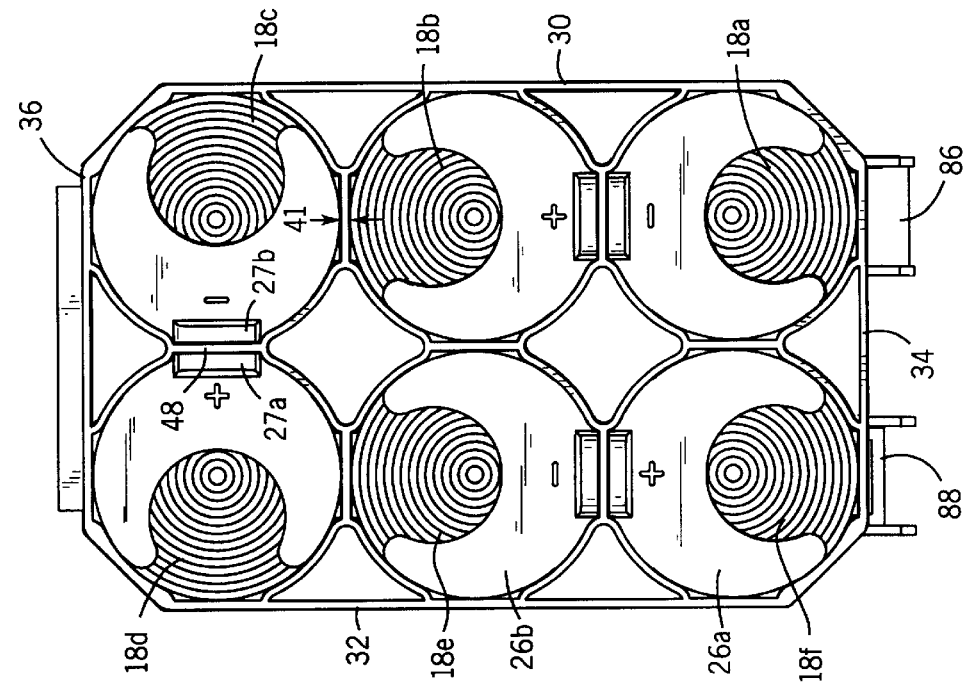
FIG. 2 is a bottom view of the battery of FIG. 1 with a top removed.

The cells 18 are received in a honeycomb structure formed in the body 12. As shown in FIGS. 2 and 3, the positive and negative straps are arranged in the honeycomb case in such a manner that they can be serially connected to each other by welding in a known manner and also can connect to terminals 86 and 88. In FIGS. 2 and 3, the two cells 18c and 18d that are remote from the terminals 86 and 88 have their tabs offset by 90°. The remaining cells 18a, 18b, 18e, and 18f have the tabs offset by 180°.

As shown in FIGS. 1–4, the preferred form of the cap-like strap utilizes a crescent shape with the opening of the crescent off-set from the centerline of the roll. Alternative strap configurations are shown in FIGS. 5–9. All of the shapes of the straps are characterized by the fact that the strap engages a portion of the projecting ends of each convolution of the spiral, while leaving another portion of the projecting ends of each convolution exposed. Each of the configurations also includes an upstanding tombstone tab for making electrical connections between adjacent cells and external terminals on the battery.

Electrolyte is introduced into the battery through vents 34 in the top 14 that are centered over each cell. The cap-like strap of this invention allows the electrolyte to readily wet all the convoluted layers.

The connection between cells can be described as follows.

With reference to FIGS. 1, 1A, 2 and 3, the body 12 includes exterior side walls 30 and 32 and exterior end walls 34 and 36 as well as a plurality of partition walls generally indicated by reference numeral 38. Partition walls 38 interconnect exterior side walls 30 and 32 and exterior end walls 34 and 36 in a modified honeycomb configuration that includes a plurality of generally octagonal shaped cell cavities 40. The honeycomb configuration includes a flat surface within each cavity to facilitate alignment of the cells within the cavity and the electrical interconnection of the cells such as by welding. Specifically, partition walls 38 include a plurality of first planar segments 46 and a plurality of second planar segments 48 oriented orthogonal to first planar segments 46. The second planar segments 48 are further orthogonal to first and second exterior end walls 34 and 36 and parallel to first and second exterior side walls 30 and 32. In a similar manner, each of first planar segments 46 are parallel to first and second exterior end walls 34 and 36 and perpendicular to side walls 30 and 32. A plurality of arcuate connector segments 50 interconnect the first and second planar segments 46 and 48 as well as couple the planar segments to the respective exterior side and end walls 30, 32, 34, and 36. Each of the arcuate connector segments 50 are integral with one or three other arcuate connector segments to define a plurality of roughly diamond shaped passages 52 or half diamond shaped passages 53, each with rounded corners as shown.

Figure 10:
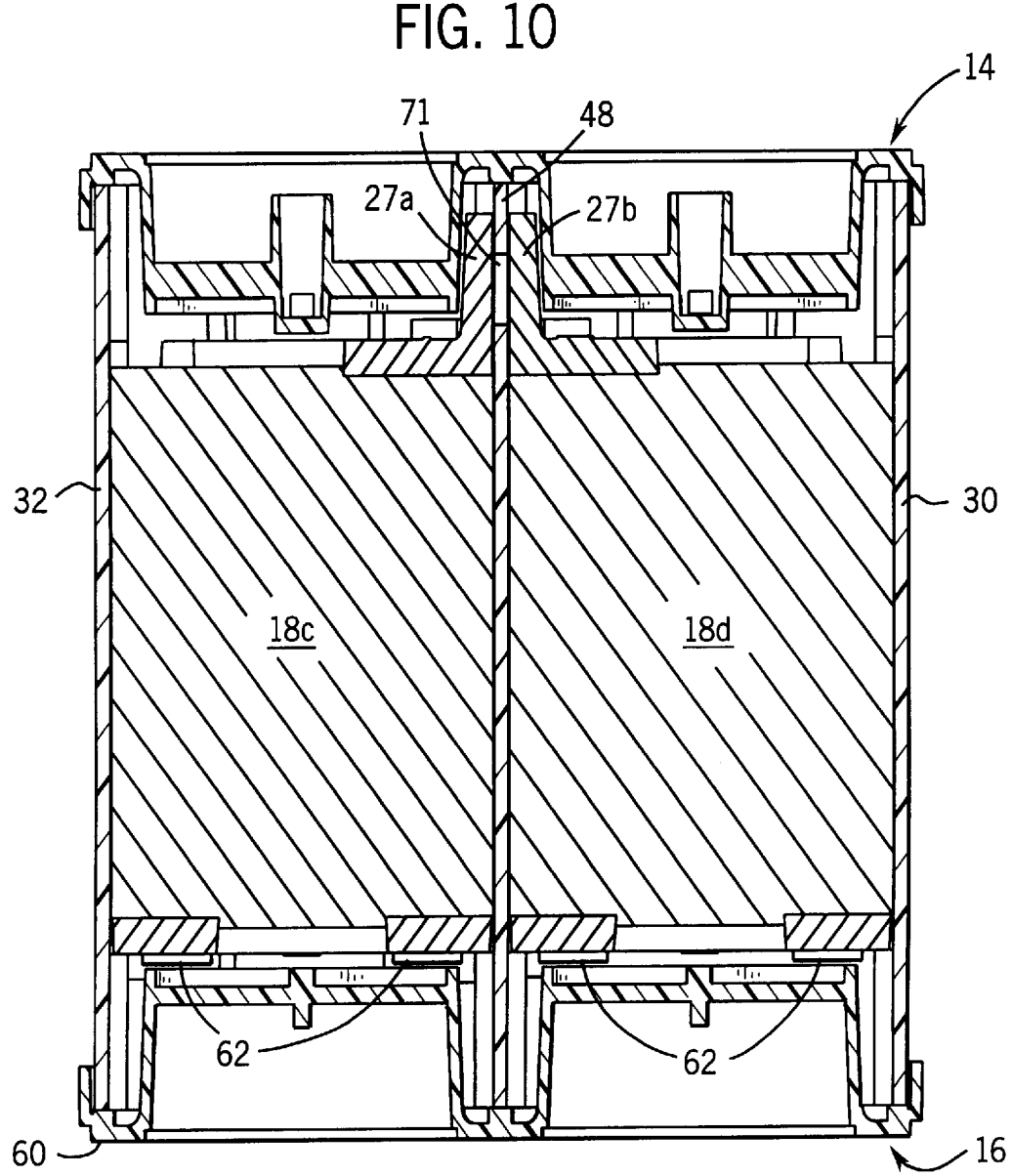
FIG. 10 is a cross-sectional view of the battery of FIG. 1A taken along the plane 5-5-5 of FIG. 1A.

The flat surfaces provided by planar segments 46 and 48 facilitate the proper alignment of each cell within its respective cavity and provide a flat surface for complete electrical interconnection of the cells by welding as hereinafter described. More particularly, as best illustrated in FIGS. 2 and 3, the tabs 27a and 27b of the cells 18a–18f are disposed within the cells 40 adjacent one of the planar surfaces 46 and 48. The welding interconnection between adjacent tabs within the battery case occurs through an orifice 71 formed in the planar segments 46 and 48 as hereinafter described and as illustrated in FIG. 10. Those skilled in the art will appreciate that a complete weld connection between adjacent tabs is facilitated by the planar configuration of surfaces 46 and 48.

As shown in FIGS. 2 and 10, the body 12 further includes a plurality of semicircular stops 62 integral with and extending inwardly from arcuate connector segments 50 and truncated planar corner segments 54. Stops 62 are recessed from lower end 60 of these respective segments to properly position the cells 18 within cell cavities 40 thereby facilitating the electrical interconnection of the cells 18 as hereinafter described. The electrical interconnection of the cells 18 within the case 10 can be described with reference to FIGS. 2, 3 and 10. As illustrated in FIG. 10, flat planar segment 48 separating cells 18c and 18d is provided with an orifice 71 for electrically connecting tabs 27a and 27b in a manner generally known in the art such as welding. Those skilled in the art will appreciate that the electrical interconnection of each of the plurality of cells 18a–18f occurring through planar segments 46 are made in a manner substantially the same as that illustrated in FIG. 10 for connection to planar segment 48.

As indicated above, the position of each cell 18a–18f within its respective cavity 40 is dictated by the positioning of stops 62 as best illustrated in FIGS. 2 and 10. More particularly, each of the cells are disposed within the respective cavity 40 until one of the straps 26a and 26b connected thereto engage the stops 62 projecting inwardly into the cavity. The stops 62 facilitate the proper positioning of the TMF cells relative to one another to allow precise electrical interconnection, as described above, with relative ease and simplicity.

What is claimed is:

1. An end strap for a thin metal film battery cell, the cell formed by a plate which is wound in a spiral thereby forming a roll with an end at which spiraled edges of the plate are exposed, the end strap comprising:

a body of electrically conductive material for abutting the end of the roll wherein the body contacts each convolution of the roll while leaving a portion of each convolution exposed so that an electrolyte is able to flow into each convolution of the roll, the body having a first major surface, a second major surface, and an edge surface extending between the first major surface and the second major surface; and a tab of electrically conductive material, the tab being attached to the first major surface of the body at a location adjacent to the edge surface, and the tab projecting outwardly from the first major surface of the body perpendicularly when the thin metal film battery cell is in use.

2. The end strap as recited in claim 1 wherein the body has a crescent shape.

3. The end strap as recited in claim 2 wherein the opening of the crescent shape is offset from a centerline of the roll.

4. The end strap as recited in claim 1 wherein the body has a semicircular shape.

5. The end strap as recited in claim 1 wherein the body has a trapezoidal shape.

6. The end strap as recited in claim 1 wherein the body is flat.

7. A battery cell comprising:

a roll formed by first and second thin metal foil plates wound in a spiral with a spiral edge of the first thin metal foil plate protruding from a first end of the roll and a spiral edge of the second thin metal foil plate protruding from a second end of the roll;

a first strap abutting the first end of the roll, the first strap including
a first body of electrically conductive material contacting each convolution of the first thin metal foil plate while leaving a portion of each convolution of the first thin metal foil plate exposed so that an electrolyte is able to flow into the roll, the first body having a first major surface, a second major surface, and an edge surface extending between the first major surface of the first body and the second major surface of the first body, and
a first tab of electrically conductive material attached to and projecting outward from the first major surface of the first body for making electrical connection to the thin metal film battery cell, the first tab projecting outwardly from the first major surface of the first body perpendicularly when the thin metal film battery cell is in use; and a second strap abutting the second end of the roll, the second strap including
a second body of electrically conductive material contacting each convolution of the second thin metal foil plate while leaving a portion of each convolution of the second thin metal foil plate exposed so that the electrolyte is able to flow into the roll, the second body having a first major surface, a second major surface, and an edge surface extending between the first major surface of the second body and the second major surface of the second body, and a second tab of electrically conductive material attached to and projecting outward from the second body for making electrical connection to the thin metal film battery cell, the second tab projecting outwardly from the first major surface of the second body perpendicularly when the thin metal film battery cell is in use.

8. The battery cell as recited in claim 7 wherein the first tab is attached to the first major surface of the first body at a location adjacent to the edge surface of the first body, and the second tab is attached to the first major surface of the second body at a location adjacent to the edge surface of the second body.

9. The battery cell as recited in claim 8 wherein the first tab is off-set from the second tab by 180 degrees.

10. The battery cell as recited in claim 8 wherein the first tab is off-set from the second tab by 90 degrees.

11. The battery cell as recited in claim 7 wherein the first body and the second body each have a crescent shape.

12. The battery cell as recited in claim 7 wherein the first body and the second body each have a semicircular shape.

13. The battery cell as recited in claim 7 wherein the first body and the second body each have a trapezoidal shape.

14. The battery cell as recited in claim 11 wherein the opening of the crescent shape is offset from a centerline of the roll.

* * * * *